United States Patent [19]

Nishida et al.

[11] 4,009,947
[45] Mar. 1, 1977

[54] REFLECTING MIRROR

[75] Inventors: Keiziro Nishida, Kanagawa; Susumu Itoh, Tokyo; Kathuhiro Konno, Kanuma, all of Japan

[73] Assignees: Canon Kabushiki Kaisha; Tochigi Canon Co., Inc., both of Japan

[22] Filed: Oct. 3, 1975

[21] Appl. No.: 619,526

Related U.S. Application Data

[63] Continuation-in-part of Ser. No. 440,028, Feb. 6, 1974, abandoned.

[30] Foreign Application Priority Data

Feb. 15, 1973 Japan .............................. 48-18538

[52] U.S. Cl. .............................. 350/288; 427/166; 428/433
[51] Int. Cl.² .......................................... G02B 5/08
[58] Field of Search .................. 350/288, 164, 166; 428/432, 433, 434; 427/165-169

[56] References Cited

UNITED STATES PATENTS

| | | | |
|---|---|---|---|
| 2,664,363 | 12/1953 | Meth | 427/168 |
| 2,762,714 | 9/1956 | Smith et al. | 427/169 |
| 2,801,935 | 8/1957 | Owen | 427/169 |
| 3,497,377 | 2/1970 | Allingham | 350/288 |

FOREIGN PATENTS OR APPLICATIONS 253,524  7/1964  Australia .......................... 427/168

*Primary Examiner*—John K. Corbin
*Assistant Examiner*—Jon W. Henry
*Attorney, Agent, or Firm*—McGlew and Tuttle

[57] ABSTRACT

A reflecting mirror which is composed of a reflecting silver layer formed on a surface of a glass base body and a protective layer being made of alloy consisting of copper and tin being formed on said reflecting silver layer. Since the reflecting layer is protected by a protective layer, this reflecting mirror has corrosion resistance.

2 Claims, 3 Drawing Figures

REFLECTING MIRROR

CROSS REFERENCE TO COPENDING APPLICATION

This application is a continuation-in-part of our patent application of Ser. No. 440,028 filed Feb. 6, 1974 and now abandoned.

BACKGROUND OF THE INVENTION

The present invention relates to a reflecting mirror in which a protective layer having corrosion resistance is formed on a reflecting silver layer.

In a conventional reflecting mirror a reflecting silver layer is formed on a glass base body and a protective layer consisting of copper is formed on said reflecting layer, wherein a coated layer is formed on said protective layer.

However, such reflecting mirror can not endure a long period of use either in a place of high temperature and high humidity or at a place of coldness. The reason therefor is that a protection afforded by copper does not sufficiently perform its role. For example, when a conventional reflecting mirror is subjected to an endurance test under an environment of a temperature of 60° C and a humidity of 95 percent, or when it is subjected to an endurance test of such temperature-humidity cycle as having one cycle of 2 hours with a temperature of 60° C and a humidity of 70 percent and 2 hours with −30° C, such damages will take place as corrosion, etc. on a reflecting silver layer. In this case, the copper foil in the protective layer is also affected without fail. In other words when the copper in the protective layer is affected, a metal reflecting layer is also damaged.

SUMMARY OF THE INVENTION

The object of the present invention is to provide a silver reflecting mirror having sufficient corrosion resistance.

For that end, the reflecting mirror of the present invention is formed by alloy consisting of copper and tin. The protective alloy layer is composed of 30 to 70 percent copper and 70 to 30 percent tin.

DETAILED DESCRIPTION OF THE PREFERRED EMBODIMENTS

Figure 1:
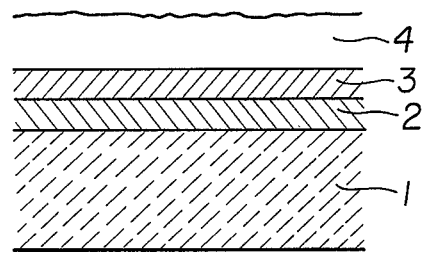
FIG. 1 is a cross-sectional view of the reflecting mirror of the present invention.

FIG. 1 shows a reflecting mirror of the present invention, wherein 1 is a glass base body, and 2 is a reflecting silver layer formed on the surface of the glass base body and being formed either by evaporation deposition of silver. 3 is a protective layer formed on the reflecting silver layer 2. This protective layer is formed by alloy consisting of copper and tin. 4 is a coated layer formed by coating synthetic resin, etc.

Now, explanations shall be made on the method of making the reflecting mirror having the above mentioned composition.

Figure 2:
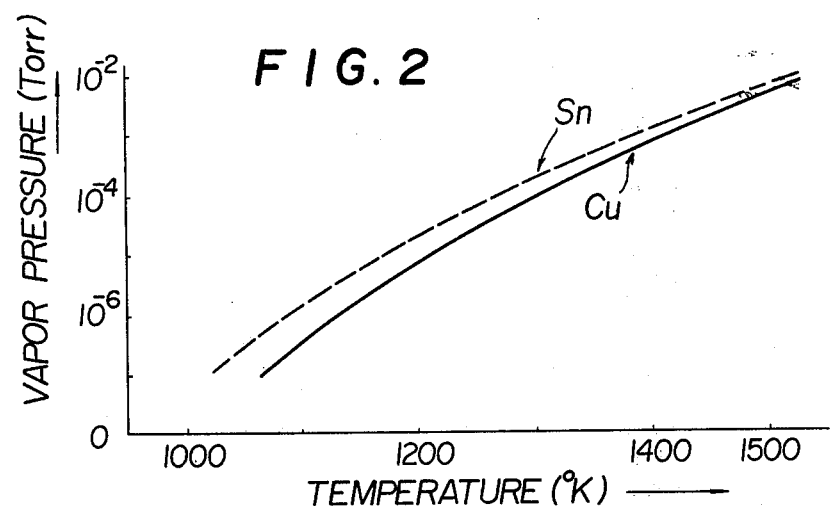
FIG. 2 is a graph showing the relationship between the temperature and the vapor pressure in copper and in tin.

When a reflecting mirror is made by a vacuum evaporation method, silver is deposited in foil thickness of approximately 2000 to 5000 A over a glass which has its surface sufficiently cleaned and is placed within a vacuum tank in which pressure is under than $5 \times 10^{-5}$ Torr. Then alloy containing 30 – 70 percent copper and 70 – 30 percent tin as is evaporated in the thickness of also 2000 to 5000 A, and when such alloy is evaporated, copper and tin may be evaporated from separate evaporation source under the condition evaporating silver. Or, since the relationship between the temperature and the vapor pressure is almost same in copper and in tin as shown in FIG. 2, copper and tin may be placed 3 : 7 – 7 : 3 by weight in a same evaporation source and heated and evaporated. Alloy foil with copper and tin can thus be made by said methods.

If the copper content in the alloy is less than 30 percent, the alloy coating tends to peel off the silver layer, meanwhile if the copper content is beyond 70 percent, only poor corrosion resistance can be obtained.

Or, such alloy consisting of copper and tin may be made beforehand and the same may be deposited by evaporation.

When the composition of alloy is precisely adjusted, it becomes necessary to make alloy foil by simultaneously evaporating each ingredient metal from two or more evaporation sources under control of temperature.

Figure 3:
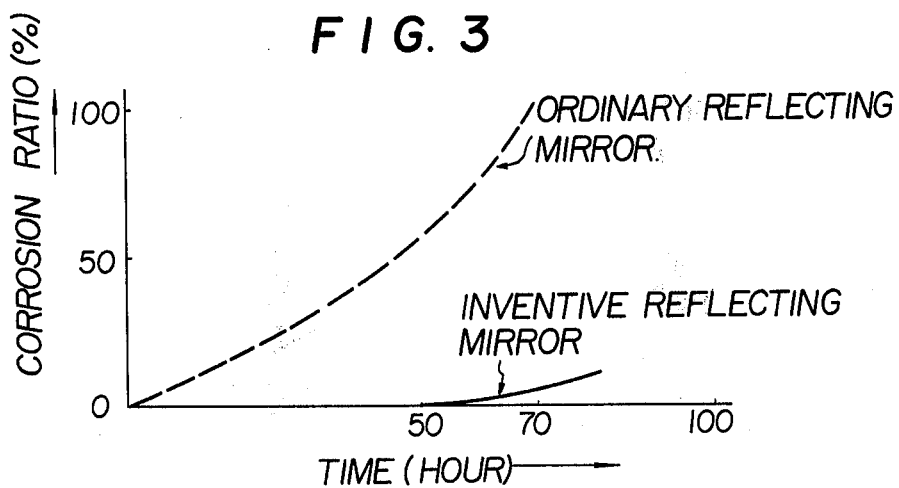
FIG. 3 is a graph showing relationship between the time and the rate of corrosion.

The reflecting mirror made in such a manner as mentioned above has enhanced endurance against humidity by about 20 times over that of conventional mirror. As shown in FIG. 3, when the mirrors were leff in an environment of a temperature of 60° C and a humidity of 95 percent, the ratio of corrosion in the mirror of the present invention in 70 hours was 5 percent against 100 percent of the corrosion in the conventional mirror in 70 hours. On the other hand, as far as chemical resistance is concerned, when the reflecting mirrors without protective coating of epoxy resin were dipped in nitric acid, the coated foil of the conventional type reflecting mirror completely peeled off from the glass surface in about 5 minutes, while the reflecting mirror of the present invention had no change at all thereon even after dipping for one hour. And it was also revealed that the mirror of the present invention is better than the conventional type reflecting mirror in such a temperature-humidity cycle test as 2 hours at temperature of 60° C and humidity of 70 percent and 2 hours at temperature of −30° C.

What is claimed is:

1. A reflecting mirror comprising a glass base body, a reflecting silver layer formed on the surface of said glass base body, and a protective layer alloy composed of 30 to 70 percent by weight copper and 70 to 30 percent by weight tin being formed on the surface of said reflecting layer opposite to said glass body.

2. The reflecting mirror described in claim 1, which has further a coated layer of epoxy resin on the surface of said protective layer opposite to said reflecting layer.

* * * * *